United States Patent [19]

Fuderer

[11] 4,333,744

[45] Jun. 8, 1982

[54] TWO-FEED PRESSURE SWING ADSORPTION PROCESS

[75] Inventor: Andrija Fuderer, Antwerp, Belgium

[73] Assignee: Union Carbide Corporation, Danbury, Conn.

[21] Appl. No.: 241,638

[22] Filed: Mar. 9, 1981

[51] Int. Cl.$^3$ ............................................. B01D 53/04
[52] U.S. Cl. .......................................... 55/25; 55/62; 55/68; 55/84
[58] Field of Search ................... 55/25, 26, 62, 68, 74, 55/75, 84, 89

[56] References Cited

U.S. PATENT DOCUMENTS

| | | | |
|---|---|---|---|
| 3,343,916 | 9/1967 | Cahn et al. | 55/62 X |
| 3,378,992 | 4/1968 | Pierce et al. | 55/62 |
| 3,430,418 | 3/1969 | Wagner | 55/25 |
| 3,986,849 | 10/1976 | Fuderer et al. | 55/25 |

*Primary Examiner*—Robert H. Spitzer
*Attorney, Agent, or Firm*—Alvin H. Fritschler

[57] ABSTRACT

One portion comprising about 30–80% of a hydrogen-containing feed gas having a relatively high carbon dioxide content is preheated to remove a substantial portion of said carbon dioxide therefrom. The thus-preheated stream is passed to a pressure swing adsorption bed from which a purified hydrogen stream is withdrawn. Upon completion of this step, the unpretreated portion of the feed gas is passed to the feed end of the bed, with purified hydrogen continuing to be withdrawn from the bed. In cyclic pressure swing adsorption operations employing such a two-feed process, the recovery of purified hydrogen is enhanced as compared with operations in which none of the feed gas is pretreated for carbon dioxide removal or in which all of the feed gas is so treated for removal of carbon dioxide therefrom.

20 Claims, No Drawings

TWO-FEED PRESSURE SWING ADSORPTION PROCESS

BACKGROUND OF THE INVENTION

1. Field of the Invention

The invention relates to the purification of a gas stream in a pressure swing adsorption system. More particularly, it relates to a process for enhancing the recovery of purified hydrogen in such a system.

2. Description of the Prior Art

The pressure swing adsorption, i.e., PSA, process is an advantageous means for separating and purifying hydrogen contained in gas streams containing carbon dioxide and other impurities. The PSA process is well known in the art, as evidenced for example by the Wagner U.S. Pat. No. 3,430,418 and the Fuderer U.S. Pat. No. 3,986,849. Gas streams containing relatively high concentrations of carbon dioxide, e.g., between about 15% and about 40% by volume, can be successfully treated by the PSA process. The hydrogen in the feed gas is separated and purified not only from the carbon dioxide, but from other components that may be present in the feed gas, such as methane, ethane, carbon monoxide, nitrogen and the like.

It is also within the skill of the art to process the feed gas stream containing such a relatively high concentration of carbon dioxide to a pretreatment absorber column wherein most of the carbon dioxide is absorbed in a suitable liquid. The thus—pretreated gas stream is subsequently further purified in a PSA system. Such combined absorption and PSA purification has the advantage that one part of the carbon dioxide content of the gas stream can be recovered as a relatively pure, e.g., 98% plus, $CO_2$, often a desirable product, in addition to the hydrogen being purified. A further advantage of the combined purification approach is that the size and cost of the PSA system are reduced thereby. In an illustrative example based on the use of an eight bed PSA system, the size of the PSA bed for treating a feed gas containing 22.9% $CO_2$, 70% hydrogen and 7.1% other components was 20 m$^3$, whereas the bed size was reduced to 12.2 m$^3$ when the feed gas was pretreated to reduce the $CO_2$ content to 3.0%, with the hydrogen content being 88% and other components 9.0%. Hydrogen recovery was increased from 86.3% for the untreated feed gas to 88.0% for the pretreated gas stream based on the hydrogen content of the feed gas. The feed flow rate was reduced from 20,000 Nm$^3$/h for the untreated feed gas to 15,900 Nm$^3$/h for the pretreated gas stream. This reduced flow rate, together with the reduced $CO_2$ content of the gas passed to the PSA unit, contributed to the indicated reduction in bed size when the feed gas is pretreated in an absorption zone to remove a substantial portion of the carbon dioxide content thereof.

The combined absorption PSA purification technique has, of course, the drawback of additional investment and operating costs associated with the liquid absorption system. There is, therefore, a desire in the art to obtain the higher hydrogen recovery and the reduced absorbent bed size of the combined purification approach, but at a reduction in the incremental costs of the liquid absorption system. Additional improvements in hydrogen recovery are likewise desired so as to further enhance the advantages associated with the PSA-hydrogen process in its important commercial applications using feed streams having relatively high concentrations of carbon dioxide.

It is an object of the invention, therefore, to provide an improved PSA process for the separation and purification of hydrogen from gas streams having relatively high concentrations of carbon dioxide.

It is another object of the invention to enhance product recovery in PSA-hydrogen process operations.

It is a further object of the invention to provide hydrogen recovery improvement and absorbent bed size reduction, as achieved by the combination absorption—PSA system, at lower operating and investment costs for the incremental, pretreatment liquid absorption system.

With these and other objects in mind, the invention is hereinafter described in detail, the novel features thereof being particularly pointed out in the appended claims.

SUMMARY OF THE INVENTION

The objects of the invention are accomplished by first passing a gas stream having a relatively low carbon dioxide content to the PSA-hydrogen system, after which a gas stream having a relativly high carbon dioxide content is passed to said system during the adsorption step of the overall PSA processing cycle. For purposes of this two-feed PSA process, a portion of the feed gas having a relatively high carbon dioxide concentration is passed to a liquid absorption system or like means for removing a substantial portion of the carbon dioxide therefrom. The thus-pretreated stream is the relatively low carbon dioxide-containing stream first passed to the PSA system. Unpretreated feed gas is the relatively high carbon dioxide-containing stream thereafter passed to the PSA system. A significant portion of the feed gas can thus by-pass the carbon dioxide removal system, essentially without disadvantage as compared with the passing of all of the feed gas to said carbon dioxide removal system for pretreatment prior to passage to the PSA system.

DETAILED DESCRIPTION OF THE INVENTION

The pressure swing adsorption process that is modified by the two-feed improvement of the invention otherwise comprises the PSA process as conventionally known in the art as it pertains to the separation and purification of hydrogen from feed gas streams. Thus, the process includes, on a cyclic basis, the steps of (1) adsorption at an elevated pressure with withdrawal of a purified hydrogen stream from the product end of the bed; (2) cocurrent depressurization of the bed to release void space gas from the product end of the bed; (3) countercurrent depressurization of the bed to a lower desorption pressure to desorb and release carbon dioxide and other impurities from the feed end of the bed; and (4) repressurization of the bed to the elevated adsorption pressure, with said steps (1)-(4) being repeated for the separation and purification of additional quantities of hydrogen. Those skilled in the art will appreciate that an additional step of purging the bed is normally employed prior to repressurization to more fully remove desorbed impurities from the bed than can be accomplished without such a purging step. Those skilled in the art will also appreciate that the PSA process for hydrogen recovery, as conventionally practiced and as practiced in accordance with the invention, will advantageously be employed in a multi-bed system having at least four adsorbent beds, with at least seven adsorbent beds being desirably employed in particular applications. Thus, four, five and six bed systems have particular advantages in some applications, while seven, eight or more beds may be more desirable for other applications. It will be understood that, in such multi-bed systems, the feed gas may be passed to more than one bed at any particular stage of the processing cycle. In all such systems, the feed gas passing to each bed during the adsorption step is divided into two parts, with the pretreated portion of low $CO_2$ content being first passed to the particular bed in question, followed by the passage of the unpretreated portion of high $CO_2$ content to said bed as indicated above. Those skilled in the art will further appreciate that, in conventional practice and in the practice of the invention, the PSA process advantageously employs, in multi-bed operations, one, two, three or more pressure equalization steps in which cocurrent depressurization gas released from one bed at an elevated pressure is used to partially repressurize another bed initially at a lower pressure. The above-indicated Wagner and Fuderer patents contain further information concerning such additional features applicable to multi-bed operations.

The invention pertains to the separation and purification of hydrogen contained in gas streams having relatively high concentrations of carbon dioxide therein. Such gas streams typically have a carbon dioxide content of from about 15% to about 40% by volume based on the overall volume of the gas stream. In the practice of the invention, the pretreated portion of the gas stream has a substantial portion of its carbon dioxide content removed therefrom, such that the unpretreated gas stream has a carbon dioxide content of at least about twice that of the pretreated gas stream. The carbon dioxide content of the pretreated gas stream is advantageously less than about 7% by volume thereof.

In forming the relatively low and high portions of the feed gas in the two-feed process of the invention, at least about 30% up to about 80% by volume of the gas stream is pretreated to remove said substantial portion of the carbon dioxide therefrom. In particular embodiments, the portion of the gas stream pretreated for carbon dioxide removal will comprise from about 40% to about 75% by volume of the overall gas stream being processed for separation and purification of hydrogen therefrom.

The portion of the feed gas to be pretreated for carbon dioxide removal cam be passed to any convenient pretreatment zone in which carbon dioxide can conveniently be removed from the hydrogen-containing gas stream being processed. As noted above, the gas stream can be passed to an absorber column wherein a substantial portion of the carbon dioxide content of the stream is absorbed in a suitable liquid. Well known techniques are commercially available for such carbon dioxide removal purposes, as for example, the Benfield aqueous alkaline scrubbing process and the Shell Sulfinol and Allied Chemical Selexol solvent extraction processes. Thus, the gas to be pretreated is passed advantageously to an absorption unit containing a liquid capable of absorbing carbon dioxide therefrom, although other forms of carbon dioxide separation units can also be employed. The gas stream pretreated therein is passed to the feed end of the adsorbent bed employed for the further purification of hydrogen in the operation of the PSA process.

It should be noted that, upon passage of the low $CO_2$, pretreated gas stream to the feed end of an adsorbent bed, the residual carbon dioxide and other impurities in the stream will be adsorbed so that a purified hydrogen stream is withdrawn from the product end of the bed. As will be appreciated by those skilled in the art, an adsorption front is formed in the bed and advances therein from the feed end toward the product end of the bed. In accordance with conventional practice, the passage of the gas stream to the bed is terminated while said adsorption front remains in the bed, i.e., before break-through of the front at the product end of the bed. The passage of the high $CO_2$, unpretreated portion of the feed gas stream to the feed end of the bed is then commenced. A second adsorption front is created at the higher concentration and adsorption loading of carbon dioxide, with a purified hydrogen stream continuing to be withdrawn from the product end of the bed. The existence of the two adsorption fronts within the bed results in the PSA system being able to treat a larger quantity of feed gas, in the practice of the invention, while still requiring essentially only the same bed size as when all of the feed gas is pretreated for carbon dioxide removal.

EXAMPLE

The following example is provided for illustrative purposes and should not be construed as limiting the scope of the invention as recited in the appended claims. In an eight bed PSA system as referred to in the background section above, with two beds on adsorption at all times and with three pressure equalization steps employed in the processing cycle, a comparative run was made to illustrate the invention using the indicated feed gas containing 22.9% $CO_2$. In accordance with the invention, 60% of the feed gas was passed to a conventional liquid absorber for carbon dioxide removal. The other 40% of the feed gas bypassed around the absorber. The pretreated portion of the feed gas was first passed to each adsorption bed, in turn, with the unpretreated portion of the feed gas being passed to each such bed after termination of the passage of the pretreated portion thereto. As in the background example, the pretreated gas had its $CO_2$ content reduced to 3%. The comparative results are summarized in the following Table. It will be understood that the flow rates of the pretreated and the unpretreated portions of the feed gas of the invention are based on the flow rates of the comparative unpretreated and the fully pretreated gas streams and the relative proportions of the feed gas pretreated and unpretreated in the practice of the invention, i.e., 60% pretreated and 40% unpretreated.

TABLE

| Case | | PSA Feed Flow $Nm^3$/hr | $CO^2$ in PSA Feed mol % | Bed Size $m^3$ | Hydrogen Recovery % of feed |
|---|---|---|---|---|---|
| 1. | No $CO_2$ column pretreatment | 20,000 | 22.9 | 20 | 86.3 |
| 2. | All feed pretreated in $CO_2$ column | 15,900 | 3.0 | 12.2 | 88.0 |
| 3. | (a) 60% of feed pretreated | (1) 9,540 | (1) 3.0 | 12.4 | 89.8 |
|    | (b) 40% unpretreated | (2) 8,000 | (2) 22.9 | | |

The hydrogen recovery is thus the highest in the third case, i.e., in the practice of the invention, with 89.8% of the hydrogen in the feed gas being recovered. Equally surprising is the small bed size required in the practice of the invention, approximating that employed when all of the feed gas was pretreated in a liquid scrubber. In practical terms therefore, this establishes that the liquid absorption $CO_2$ removal system can be bypassed by a significant portion of the feed gas without any penalty, and an actual improvement, in PSA process performance. In the example, the pretreatment $CO_2$ removal system was bypassed by 40% of the initial feed gas. As a result, 40% less energy is required for pumping the liquid solution employed in the scrubber. Other utilities associated with the scrubber will be reduced in the same proportion, and investment costs for the liquid scrubber are estimated to be reduced by about 20%.

The PSA system of the invention is believed to be able to treat a larger quantity of gas in essentially the same bed size as is employed in the case 2 example because of the existence of two adsorption fronts in each bed, the first at low loading and concentration and the second with higher loading and concentrations of $CO_2$. During current depressurization, the second front advances faster than the first front, although it typically, in many embodiments, may not reach the first front completely. While the product end of the absorbent beds are in very similar condition in both cases, i.e., cases 2 and 3, the invention enables the feed end of the beds to be more strongly utilized. The hydrogen recovery is believed higher in the practice of the invention because the second, untreated feed contains a lower concentration of hydrogen, and the bed at the end of current depressurization contains less hydrogen as well. As a result, the loss of hydrogen during countercurrent depressurization will be lower.

It will be understood that various changes and modifications can be made in the practice of the invention without departing from the scope thereof as recited in the claims. The amount of feed gas pretreated for carbon dioxide removal will be understood to depend on a variety of processing factors pertinent to any given application. One such factor not directly related to the PSA system is the quantity of carbon dioxide desired to be recovered as relatively pure $CO_2$ in the liquid absorption system or other carbon dioxide removal system. Another factor is the overall optimum conditions found to pertain to both the PSA and the pretreatment liquid system.

It should be noted that, while the passage of pretreated gas to any given bed is terminated prior to the passage of unpretreated gas thereto in any particular PSA processing cycle, the pretreatment of a portion of the feed gas need not be carried out on a cyclic basis as a pretreatment step to be completed prior to the passage of pretreated gas to the PSA system. Thus, the preheatment of a portion of the feed gas stream can be carried out continuously or in any other convenient manner, with the pretreated gas being employed in the cyclic PSA processing operations as indicated herein.

In the repressurization of the adsorbent beds, it has been found desirable, in particular embodiments, to pass external source nitrogen gas to the bed for such repressurization purposes. Such nitrogen is thereafter withdrawn from the bed with the purified hydrogen stream. In this manner, an ammonia synthesis stream is formed and recovered from the PSA system. Similarly, such nitrogen can be employed as a purge gas, such nitrogen remaining in the bed upon completion of the purging step thereafter being withdrawn from the bed with purified hydrogen to again form an ammonia synthesis gas. In such embodiments, it will be understood that nitrogen may be used for both purging and repressurization purposes. PSA systems having at least seven adsorbent beds are particularly advantageous in such embodiments in which ammonia synthesis gas, instead of hydrogen, is the desired pure product, It is estimated that recovery for the two-feed process of the invention with nitrogen purge will be higher than indicated in the example above, with the advantage of case 3 over case 2 of the example believed to be at least 3% of hydrogen recovery.

The invention will be seen to constitute a significant advance in the field of pressure swing adsorption. The highly desirable improvement in hydrogen recovery obtainable by the two-feed PSA process of the invention reduces the fuel and feed requirements of the hydrogen generation system. The invention likewise permits a desirable saving of investment and operating costs for the pretreatment carbon dioxide absorption system. The invention thus contributes to the continuing development of the PSA process for the purification of hydrogen in practical commercial applications.

Therefore, I claim:

1. An improved pressure swing adsorption process for the separation and purification of hydrogen contained in a gas stream having a relatively high concentration of carbon dioxide therein comprising:
 (a) pretreating at least about 30% up to about 80% by volume of said gas stream to remove a substantial portion of said carbon dioxide therefrom, the unpretreated gas stream having a carbon dioxide content of at least about twice that of the thus-pretreated gas stream;
 (b) passing the pretreated gas stream at an elevated adsorption pressure to the feed end of an adsorbent bed capable of adsorbing carbon dioxide and other impurities of said stream, a purified hydrogen stream being withdrawn from the product end of the bed having an advancing adsorption front therein;
 (c) upon completion of step (b), passing the unpretreated gas stream to said feed end of the bed at essentially the same pressure as in step (b), a second adsorption front being created at the higher concentration and adsorption loading of carbon dioxide, a purified hydrogen stream continuing to be withdrawn from the product end of the bed;
 (d) concurrently depressurizing said bed to release void space gas from the product end of the bed;
 (e) countercurrently depressurizing said bed to a lower desorption pressure to desorb and release carbon dioxide and other impurities from the feed end of the bed;
 (f) repressurizing said bed to said elevated adsorption pressure; and
 (g) repeating said steps (b)–(f) for the separation and purification of additional quantities of hydrogen;
whereby the recovery of purified hydrogen is enhanced at a significant savings in equipment and operating costs as compared with the pretreatment of all of the gas stream for removal of carbon dioxide therefrom.

2. The process of claim 1 in which from about 40% to about 75% by volume of the gas stream being processed is pretreated for removal of carbon dioxide therefrom.

3. The process of claim 1 in which the gas to be pretreated is passed to an absorption unit containing a liquid capable of absorbing carbon dioxide therefrom.

4. The process of claim 1 and including purging the bed prior to repressurization to more fully remove desorbed impurities from the bed.

5. The process of claim 4 in which nitrogen gas is employed for purging, the nitrogen remaining in the bed upon completion of the purging step thereafter being withdrawn from the bed with said purified hydrogen stream, thus forming an ammonia synthesis gas.

6. The process of claim 5 in which nitrogen gas is employed for repressurization of the bed.

7. The process of claim 6 in which at least seven adsorbent beds are employed.

8. The process of claim 5 in which at least seven adsorbent beds are employed.

9. The process of claim 8 in which eight adsorbent beds are employed.

10. The process of claim 1 in which said gas stream to be treated has a carbon dioxide content of from about 15% to about 40% by volume.

11. The process of claim 10 in which said pretreated gas stream has a carbon dioxide content of less than about 7% of volume thereof.

12. The process of claim 1 in which the pretreated and the unpretreated gas streams are passed, on a cyclic basis, to at least four absorbent beds, each of which is contacted by said gas streams, in turn, at elevated adsorption pressure, undergoes said cocurrent and countercurrent depressurization, and is repressurized from said lower desorption pressure to said elevated adsorption pressure for use in the adsorption of carbon dioxide and other impurities, and the withdrawal of purified hydrogen, upon contact with additional quantities of said pretreated and unpretreated gas streams.

13. The process of claim 12 in which four adsorbent beds are employed.

14. The process of claim 12 in which five adsorbent beds are employed.

15. The process of claim 12 in which six adsorbent beds are employed.

16. The process of claim 12 in which at least seven adsorbent beds are employed.

17. The process of claim 16 in which eight adsorbent beds are employed.

18. The process of claim 1 in which the repressurizing of the bed comprises the passing of nitrogen gas to the bed for such repressurization, nitrogen thereafter being withdrawn from the bed with said purified hydrogen stream, thus forming an ammonia synthesis gas.

19. The process of claim 18 in which at least seven adsorbent beds are employed.

20. The process of claim 19 in which eight beds are employed.

* * * * *